United States Patent [19]

Humphrey et al.

[11] 4,302,479

[45] Nov. 24, 1981

[54] PREPARATION OF ISO-ALPHA-ACID-CONTAINING HOP EXTRACTS

[75] Inventors: Anthony M. Humphrey, Chorley Wood; Anthony Lewis, London, both of England

[73] Assignee: Albright & Wilson Ltd., Warley, England

[21] Appl. No.: 153,331

[22] Filed: May 27, 1980

Related U.S. Application Data

[63] Continuation of Ser. No. 927,834, Jul. 25, 1978, abandoned, which is a continuation-in-part of Ser. No. 819,564, Jul. 27, 1977, abandoned.

[30] Foreign Application Priority Data

Jul. 29, 1976 [GB] United Kingdom ............... 31620/76

[51] Int. Cl.$^3$ ........................... C12C 3/00; C12C 9/02
[52] U.S. Cl. ................................... 426/600; 426/429; 426/431

[58] Field of Search ................. 426/600, 429, 431, 16, 426/651, 655

[56] References Cited

U.S. PATENT DOCUMENTS

3,532,504  10/1970  Flesch ................................. 426/600
3,558,326  1/1971  Westermann et al. ............... 426/600
3,875,316  4/1975  Humphrey .......................... 426/600

Primary Examiner—David M. Naff
Attorney, Agent, or Firm—Frishauf, Holtz, Goodman & Woodward

[57] ABSTRACT

When preparing hop extract containing iso-alpha-acids, improved yield of iso-alpha-acids is obtained by contacting a solution of extracted alpha-acids in a water-immiscible non-polar liquid with a sufficiently strong aqueous solution of acid to provide a pH of less than 1 in an aqueous phase that separates from the non-polar liquid. After contacting with the acid, the alpha-acids are isomerized such as by forming alpha acid salts and heating the salts.

23 Claims, No Drawings

PREPARATION OF ISO-ALPHA-ACID-CONTAINING HOP EXTRACTS

This is a continuation of application Ser. No. 927,834 filed July 25, 1978 now abandoned, which, in turn, is a continuation-in-part of Ser. No. 819,564, filed July 27, 1977, now abandoned.

Our invention relates to hop extracts and in particular to a method for the preparation of isomerised hop extract.

It has long been known that the bitter principle of hops is derived from a fraction of the acidic soft hop resins known as the alpha-acids. During the conventional brewing process, boiling wort (unfermented beer) converts a part of the almost water insoluble alpha-acids into the rather more water soluble iso-alpha-acids. Traces of the latter dissolve in the beer, usually in an amount of between 20 and 30 ppm, to provide the characteristic bitter flavour.

The conventional brewing process is highly inefficient in its utilisation of hops, and it has been proposed to replace hops, at least partially, by extracts containing iso-alpha-acids, prepared by boiling the alpha acids with aqueous alkali. Such extracts can be added to cold fermented beer, provided that they are in a sufficiently purified, soluble and dispersible form. However, the preparation of isomerised extracts of sufficient purity and solubility has presented considerable difficulties.

Hop resins comprise a very large number of different compounds, which occur in association with various fixed and essential oils and waxes. The alpha-acids themselves comprise a number of different compounds, which differ only slightly in their physical and chemical properties from other resins and oils whose presence in the extract can adversely affect their solubility or flavour. The difficulty of separating these compounds is increased by their tendency to entrain one another, and by the sensitivity of some of them to degradation by chemical reagents, such as hot alkali, which may give rise to intense and pervasive off flavours. For this last reason early attempts to extract alpha-acids from whole hops with hot aqueous alkali were soon abandoned.

All the more recent attempts to prepare hop extract for commercial use have involved extracting alpha-acids from the hops with an organic solvent and subsequently transferring the extract into an aqueous medium, usually by methods involving liquid/liquid extraction or precipitation. Of these processes the majority have involved heating the alpha-acids in an aqueous, alkaline or basic medium, however one proposal, described in British Patent Specification No. 1,423,129 corresponding to U.S. Pat. No. 3,875,316, has been to extract hops with a water immiscible organic solvent, isomerise the alpha-acids with a base, while dissolved in the organic solvent, and finally extract the iso-alpha-acids from the solvent into an aqueous solution.

A disadvantage of all the prior art processes which have been operated on a commercial scale has been that the yield of iso-alpha-acid finally recoverable, based on the alpha-acid extracted, has been substantially less than that predicted by theory and has varied greatly from one batch of hops to another. We have now discovered that when hops are extracted with organic solvents to provide an alpha-acids-containing extract, and the alpha-acids, either before or after isomerisation, are transferred from a water immiscible solvent phase to an aqueous alkaline phase, the yield of iso-alpha-acid or alpha-acid recovable from the water immiscible solvent by liquid extraction with aqueous alkali may be improved by strongly acidifying the extract at some stage prior to the first extraction into aqueous alkali.

One object of our invention is to obtain improved yields of iso-alpha-acids when hops are extracted with organic solvents and the extracted alpha-acids are isomerised by bases, especially alkalis, in aqueous or preferably substantially non-aqueous media.

A further object of our invention is to obtain more consistently high yields of alpha-acids from hops of different quality with regard to age and condition.

Our invention provides, in the method for the preparation of hop extract which comprises extracting hops with an organic solvent to form an alpha-acids-containing hop extract and transferring the alpha-acids, or iso-alpha-acids derived therefrom, from a water immiscible, non-polar organic solvent, to form a solution of their salts in an aqueous alkaline phase, the improvement which consists in that said extract containing said alpha-acids, or a solution thereof in a water immiscible non-polar organic solvent, is contacted, prior to the first transfer thereof into an aqueous alkaline phase, with a strong aqueous acid having a pH below 1.

Preferably, after the hops have been extracted with an organic extracting solvent in accordance with prior art methods, the solution of hop extract in the extracting solvent, a primary extract recovered therefrom by evaporation of the extracting solvent, or a solution obtained by redissolving the primary extract in a water immiscible, non-polar solvent, is contacted with the acid. The acidified extract is then, preferably, isomerised by any convenient method; e.g. by contacting the extract, or a solution thereof in a water immiscible solvent with an essentially anhydrous alkali, to form alpha-acid salts, and heating the salts as described in our co-pending U.S. application Ser. No. 927,833, now abandoned, of even date herewith, which is a CIP of U.S. application Ser. No. 819,232, filed July 26, 1977, now abandoned; or by extracting the alpha-acids as their alkali metal salts from an organic solvent with aqueous alkali and boiling an aqueous alkaline solution of the alkali metal salts, as described, for example, in the aforesaid U.S. Pat. No. 3,949,092, or in U.S. Pat. Nos. 3,558,326, 3,607,298, 3,686,316, B. Pat. No. 1,158,697, or B. Pat. No. 1,187,789.

It is, of course, well known to neutralise the water-soluble alkali metal salts of alpha-acids with acid in order to convert them into the water insoluble and hydrocarbon-soluble free alpha-acids. This is done in order to precipitate the alpha-acids from an aqueous alkaline solution, or to transfer them into an organic non-polar solvent. Such neutralisation normally requires lowering the pH from about 8 to about 7. The present invention however, involves treating an extract already containing the free alpha-acids with a very strong acidification, which does not, apparently, affect their solubility in organic solvents, but which has the totally unexpected effect of rendering them more completely extractable by aqueous alkali, either before or after isomerisation. It is difficult to postulate a credible mechanism to account for this surprising phenomenon, however we have verified beyond any doubt that it occurs and is of major commercial significance. One possible explanation is that some fraction of the hop alpha-acids, which increases as the hops are permitted to deteriorate, is present in a hitherto unrecognised chemical form, possibly a dimer or similar potential precursor of normal alpha-acid, which behaves in nearly all respects like normal monomeric alpha-acid, being soluble in organic solvents and isomerisable and registering as alpha-acid in conventional assaying methods, but which differs from normal alpha-acid in being insoluble, or less soluble, in aqueous alkali, and that on isomerisation this non-alkali-extractable alpha-acid forms a similarly non-alkali-extractable iso-alpha-acid. If this is correct, then presumably strong acid converts the non-alkali-extractable alpha-acids into normal, alkali-extractable alpha-acids. We have no clear evidence that the foregoing explanation is the correct one, but we have not, so far, been able to devise an alternative that fits our observations. However this may be it will be understood that the unqualified term "alpha-acids" as used herein is intended, where the context so permits, to include any non-alkali-extractable alpha-acid that may be present.

A solution of the alpha-acid-containing extract in a water-immiscible, substantially non-polar organic solvent may be prepared in any of the known ways, such as those described in the aforesaid British patent or in B. Pat. No. 1161787 corresponding the U.S. Pat. No. 3,949,092. The hops, or lupulin resin physically separated therefrom may optionally be ground and extracted with the isomerising solvent, and insoluble material separated therefrom. Alternatively the hops may be extracted with any other convenient solvent for alpha-acids, the extract recovered from the extracting solvent, e.g. by evaporating the latter, and redissolved in the chosen solvent.

Suitable extracting solvents include aromatic hydrocarbons such as benzene, toluene, or xylene, halocarbons such as methylerechloride or trichlorethylene, and aliphatic hydrocarbons such as petroleum or hexane. It is also possible to use alcohols such as methanol or ethanol, ketones such as acetone, or any other organic liquid capable of dissolving alpha-acids from hops. A particularly preferred solvent is liquid carbon dioxide. It is essential that neither the hops nor the extract should be exposed to any strong aqueous alkaline solvents at this stage. Acidic extracting solvents may be used but are generally inconvenient.

The extract may be subjected to one or more purification stages, such as have been proposed in the prior art such as chilling the solution in the extracting or isomerising solvent to precipitate waxes, or redissolving the extract in aqueous methanol to reject fixed oils, however such treatments are not essential.

A preferred method of isomerisation is to contact an essentially anhydrous alkali with the extract, or with a solution thereof in a solvent which is water immiscible and has a generally non-polar character so that it dissolves alpha-acids and iso-alpha-acids, but dissolves their alkali metal salts less readily than does water. The latter solvent may be any of those described in the aforesaid British Pat. No. 1,423,129 and is preferably a hydrocarbon, e.g. a petroleum or terpene hydrocarbon, or hop essential oil. Usually on technical grounds saturated hydrocarbons are preferred, but olefins are operative and may sometimes be the solvent of choice on economic grounds. Alternatively aromatic hydrocarbons or halocarbons may be used. Preferably the solvent has a boiling point greater than 80° C. and usually less than 200° C., most preferably 100° C. to 150° C. e.g. 110° to 130° C. Solvents boiling below 80° C. are not recommended, since it is preferred to isomerise at temperatures above 80° C., however they could be used if heating under pressure is feasible, or if a slow rate of isomerisation can be tolerated. Solvents boiling above 200° C. are operative, but are less readily recoverable, and usually less convenient. Typical examples of suitable isomerising solvents include parafins, e.g. petroleum fractions having the desired boiling point, aromatic hydrocarbons such as toluene or more preferably xylene, and terpene hydrocarbons such as limonene. Generally speaking any liquid saturated or aromatic hydrocarbon having a boiling point in the preferred ranges may be used as the isomerising solvent. Olefinic hydrocarbons are generally operative although very highly unsaturated hydrocarbons may cause difficulties. Halocarbons such as tetrachloroethane or chlorobenzene are operative but less preferred.

The concentration of the hop extract in the organic solvent is not critical, but generally speaking the higher the concentration, the more commercially attractive is the process.

The acidification step is an important and distinctive feature of the present invention.

The acidification step can produce beneficial results at any stage of the preparative process prior to the first extraction of the alpha-acids or of iso-alpha-acids derived therefrom into an aqueous alkaline phase. Preferably the acidification is carried out on the solution of alpha-acids in a water immiscible non-polar solvent. Alternatively it may be carried out on the extract recovered after evaporating the extracting solvent or on the hop prior to, or during extraction. Acidification does not produce the characteristic advantages of the invention when applied to aqueous solutions of alpha-acid salts. It causes precipitation of free alpha-acids, which are difficult to redissolve. There is no substantial advantage according to this invention in acidifying alpha-acids, after they have been extracted into aqueous alkali.

To be effective, strong acidification is required, using an acid capable of providing solutions having a pH lower than 1. The lower the pH of the acid washings after the acidification, the better. Preferably the pH is below 1, more preferably below 0.5, most preferably it is negative. Any acid capable of providing pH below 1 is operative, provided that it does not cause substantial degradation of the product. The preferred acid is hydrochloric acid. Phosphoric, sulphuric and trichloroacetic acids are also operative. Sulphur dioxide is operative but highly inconvenient. Concentrated nitric acid is too strong an oxidising agent to be preferred and sulphamic acid and most carboxylic acids are too weak.

Typically the acidification step comprises contacting a solution of alpha-acids in a water-immiscible solvent with an excess of strong aqueous mineral acid e.g. hydrochloric acid. In order to facilitate the acidification and reduce the difficulties caused by intractable emulsions it is usually preferred to acidify in the presence of a water miscible organic solvent such as methanol or ethanol.

After the acidification step, any excess of aqueous acid is preferably separated from the extract, in order to reduce the amount of water present in the isomerisation step and the amount of base required.

In the case of acids, such as phsophoric acid, which may be appreciably soluble in the isomerising solvent, it is frequently sufficient to dissolve a small amount of the acid in the solvent. The use of large excesses and the presence of water miscible solvents may then be avoided. Phosphoric acid also has a practical advantage over hydrochloric acid of being less aggressive to steel apparatus.

The isomerisation is preferably effected with substantially anhydrous alkali, preferably potassium hydroxide or most preferably potassium carbonate. Sodium alkalis are less preferred, because the sodium salts of iso-alpha-acids cannot be obtained as a stable concentrated aqueous solution, unlike the potassium salts. The alkali precipitates a resinous salt phase which may be heated alone or in the presence of organic solvent. The isomerisation may alternatively be carried out by extracting the alpha-acids, after acidification, into an aqueous alkaline phase and heating an aqueous solution of these alkali metal salts.

The isomerisation is preferably performed at temperatures above 100° C. e.g., when the isomerisation occurs in solution, or in the presence of a solvent, at temperatures at, or near, the boiling point of the solvent. Lower temperatures are possible, but are commercially unattractive due to the length of time required. Preferred temperatures for an essentially anhydrous isomerisation are 100° to 150° C. e.g. 110° to 140° C. At such temperatures the reaction can usually be taken to completion within 30 minutes.

The amount of anhydrous alkali added may be, desirably, such as to produce a pH, when the isomerised solution is subsequently washed with water, sufficient to extract the iso-alpha-acids into the aqueous phase, but not sufficient to extract the weaker beta-acids. The exact pH required depends on the affinity of the isomerising solvent for the iso-alpha-acids and the proportion of other hop resins and oils present. Pure iso-alpha-acids can be extracted from petroleum at pH's between 7 and 8. However in the presence of substantial amounts of resin, or in stronger solvents, higher pH's are usually required. In practice we usually prefer to achieve a final pH of 8.0 to 9.5, preferably 8.5 to 9.2. Typically an excess of the alkali is used over the stoichiometric amount based on the alpha-acids and any acid dissolved in the solvent after the acidification step, preferably a 20 to 50% excess e.g. a 30 to 40% excess. If sufficient alkali is not added the isomerisation is slower and may not go to completion, and the subsequent aqueous washing does not efficiently extract the iso-alpha-acids unless additional alkali is added at that stage. Excessive amounts of alkali can cause degradation of the iso-alpha-acids, generation of off flavours and extraction of relatively insoluble resinous material on subsequent washing, as well as negating much of the benefit of this invention. In calculating the stoichiometry of the alkali, carbonates should be regarded as diacidic bases.

The preparation of the final product may be carried out in two stages, the first stage using sufficient water to recover substantially all the iso-alpha-acids as a dilute solution of their salts and the second comprising precipitating the iso-alpha-acids with an alkaline earth metal, zinc or aluminium or extracting them with a polar water immiscible solvent, such as isobutanol, ethyl acetate or methyl isobutyl ketone in order to transfer them to a more concentrated aqueous solution as described in B. Pat. No. 1161787. The final product is preferably an aqueous solution of potassium iso-alpha-acid salts, preferably having a concentration of from 10% to 70% by weight of the iso-alpha-acid salts, most preferably 20% to 60% by weight. Preferably the final product has a pH of from 8.8 to 9.0.

Aqueous extracts prepared according to our invention can be stored, and are preferably used by diluting them to less than 5% e.g. about 2% by weight of iso-alpha-acid, with distilled water. The diluted extract is then dispersed into cold fermented beer to provide the desired degree of bitterness. Extracts prepared according to our invention may be reduced e.g. with sodium or potassium borohydride or dithionite to provide light stable extracts.

EXAMPLE 1

232 gm of methylene chloride extract of hops (containing 100 gm alpha-acids) was dissolved in 700 ml limonene. The solution was decanted off the residual solid which was washed with 100 ml limonene. The combined solutions were acidified by shaking with a solution consisting of 100 ml methylated spirit, 50 ml water and 50 ml concentrated hydrochloric acid, and the mixture was allowed to separate. The lower aqueous alcoholic layer (pH 0) was discarded. The limonene solution was heated with 26.6 gm of dry potassium carbonate (a 40% excess) at 100°–120° C. for 30 minutes, traces of water and methylated spirits being allowed to distil off. One liter of water was added over 30 minutes, while the mixture was maintained at 100° C. The mixture was allowed to separate. The aqueous layer (pH 9.2) was recovered, back-washed with 100 ml limonene, and filtered. 8 gm oleic acid was added to suppress gushing (as described in U.S. Pat. No. 3,870,810) and the pH of the solution was raised to 10.3 with 80 ml of 25% potassium carbonate. The solution was then extracted with three portions of ethyl acetate (500 ml, 300 ml, 200 ml) and the combined extracts desolventised by evaporation. The residue was dissolved in water, 1.5 ml of 25% potassium carbonate was added so that a 5% solution had a pH of 8.8 and the weight of the extract was adjusted to 200 gm to provide an aqueous solution containing 35.1% iso-alpha-acid (70.2 gm) representing a 70.2% recovery.

EXAMPLE 2

116 gm of methylene chloride extract of hops containing a total of 50 gm alpha-acids was dissolved in limonene (350 ml +50 ml) as described in Example 1. The solution was stirred with 5 ml of 90% orthophosphoric acid for 1 hour. 23.8 gm of solid potassium carbonate was added (11 gm to neutralise the phosphoric acid to dipotassium phosphate and 12.8 gm representing a 35% excess over the alpha-acid content). The mixture was heated to 100°–130° C. for 30 minutes. 750 ml water was added while the mixture was maintained at boiling point. The layers were then separated and the aqueous layer (pH 8.7) was washed with 100 ml limonene. The aqueous layer, and some resin which had been salted by the potassium phosphate, were mixed with 2.5 gm oleic acid and 50 ml of 25% aqueous potassium carbonate and then extracted with ethyl acetate (400 ml, 200 ml, 100 ml). The solvent was evaporated under reduced pressure and the residue taken up in water and concentrated to 103 gm. The product contained 35% iso-alpha-acids (36.1 gm) representing a yield of 72.2%.

COMPARATIVE EXAMPLE 232 gm of methylene chloride extract of hops (43.2% alpha-acids) was dissolved in 700 ml limonene. The solution was decanted off the insoluble residue, which was washed with 100 ml limonene. The combined limonene solution was stirred with 25.6 gm of solid potassium carbonate (a 35% excess over the alpha-acids present). The mixture was heated at 120° C. for 20 minutes and allowed to cool to 100° C. 1 liter of water was added, while the temperature was maintained at 100° C. The mixture was allowed to separate and the aqueous layer (pH 9.2) was recovered, washed with 100 ml limonene and filtered 5 gm oleic acid and 50 ml of 25% potassium carbonate solution were added, raising the pH to 10.4, and the solution was extracted with ethyl acetate (500 ml, 300 ml, 200 ml). The extract was distilled under reduced pressure to remove the solvent. The residue was dissolved in water and 1.5 ml of 25% potassium carbonate was added so that the pH of a 5% solution was 8.8. The product was concentrated to 142 gm. It contained 37.6% iso-alpha-acids, i.e. a yield of 53.3%.

We claim:

1. In the method for the preparation of an isomerized hop extract which consists essentially in extracting alpha-acids from hops with a solvent for alpha-acids to form an alpha-acid-containing hop extract, contacting a solution of said alpha-acids in a water immiscible, non-polar liquid with a base selected from the hydroxides and carbonates of sodium and potassium whereby said base and said alpha-acids react to form salts of the alpha-acids, heating said salts to effect isomerisation thereof, and transferring said isomerised salts, into an aqueous, alkaline phase, the improvement which consists in that a solution of the alpha-acids in a water immiscible non-polar liquid is contacted, prior to conversion into the salt form, with a sufficiently strong aqueous solution of acid to provide a pH of less than 1 in an aqueous phase that separates from said water-immiscible non-polar liquid after contacting said solution of alpha acids with said aqueous solution of acid.

2. A method according to claim 1 wherein the alpha-acids are extracted from the hops with a solvent selected from the group consisting of liquid hydrocarbons, halocarbons and carbon dioxide.

3. A method according to claim 2 wherein the alpha-acid-containing hop extract is recovered from the extracting solvent by evaporation of said solvent prior to contacting with acid.

4. A method according to claim 1 wherein said non-polar liquid is a liquid hydrocarbon.

5. A method according to claim 4 wherein said liquid hydrocarbon is a petroleum hydrocarbon.

6. A method according to claim 4 wherein said liquid hydrocarbon is a terpene hydrocarbon.

7. A method according to claim 1 wherein said non-polar liquid is hop essential oil.

8. A method according to claim 4 wherein said liquid hydrocarbon has a boiling point between 80° and 200° C.

9. A method according to claim 1 wherein said aqueous solution of acid is hydrochloric acid.

10. A method according to claim 1 wherein said aqueous solution of acid is selected from the group consisting of phosphoric, sulphuric and trichloroacetic acid.

11. A method according to claim 1 wherein said aqueous solution of acid contains a proportion of a water miscible alcohol.

12. A method according to claim 1 wherein said aqueous phase having a pH less than 1 is separated from said non-polar liquid and said alpha-acids in said non-polar liquid are contacted with a base selected from the group consisting of substantially anhydrous hydroxides and carbonates of potassium and sodium, to form a precipitate of the alkali metal salts of the alpha-acids, said salts are heated to isomerise said salts and said isomerised salts are transferred to said aqueous alkaline phase after isomerisation by contacting said salts with sufficient water to dissolve them.

13. A method according to claim 12 wherein said base is a substantially anhydrous potassium alkali.

14. A method according to claim 13 wherein said potassium alkali is potassium carbonate.

15. A method according to claim 12 wherein the isomerisation occurs at a temperature between 100° and 150° C.

16. A method according to claim 12 wherein said base is said hydroxide or carbonate of potassium and said alpha-acids are recovered, after isomerisation, by contacting said salts in said non-polar liquid with an aqueous phase having a pH after said contacting sufficient to extract the iso-alpha-acids as their potassium salts into the aqueous phase but insufficient to extract beta-acids as their potassium salts into the aqueous phase.

17. A method according to claim 14 wherein the pH of said aqueous phase is between 8 and 9.5.

18. A method for the preparation of isomerised hop extract which consists essentially in contacting a solution of an alpha-acid-containing hop extract in a non-polar, water-immiscible liquid having a boiling point greater than 100° C. with a sufficiently strong aqueous solution of acid to produce an aqueous phase after said contacting having a pH of less than 1, separating said aqueous phase from said liquid, contacting said liquid with a substantially anhydrous base selected from the group consisting of the hydroxides and carbonates of sodium and potassium to precipitate salts of the alpha-acids, heating said salts in said liquid at a temperature between 100° C. and 150° C., to form salts of iso-alpha-acids, contacting said salts of iso-alpha-acids with sufficient water to dissolve them at a pH between about 8 and 9.5, and separating an aqueous solution of iso-alpha-acid salts from said liquid.

19. A method for the preparation of isomerised hop extract which consists essentially in extracting hops with a volatile solvent for alpha acids, evaporating said solvent to form a hop extract containing alpha-acids, beta-acids and hop oils, dissolving said extract in a water-immiscible non-polar liquid contacting said extract in said liquid with a sufficiently strong aqueous solution of acid to produce an aqueous phase that separates from said liquid having a pH below 1, separating said aqueous phase from said non-polar liquid, contacting said liquid with sufficient substantially anhydrous potassium carbonate to form potassium salts of said alpha-acids, but not to form potassium salts of said beta-acids, heating said salts while in said non-polar liquid to isomerise said salts of said alpha-acids to form potassium salts of iso-alpha-acids, contacting said isomerised salts in said non-polar liquid with sufficient water to dissolve said salts of iso-alpha-acids at a pH insufficient to convert said beta-acids to the salt form, and in the presence of sufficient non-polar, water-immiscible liquid to retain said beta-acids in said non-polar liquid, and separating said liquid from an aqueous phase containing said iso-alpha-acid salts.

20. A method according to claim 19 wherein said volatile solvent is liquid carbon dioxide.

21. A method according to either of claims 19 and 20 wherein said non-polar, water-immiscible solvent is hop oil contained by said extract.

22. A method according to claim 21 wherein said hop oil is recovered by steam distillation from said extract and at least partially recycled.

23. A method for the production of isomerised hop extract which consists essentially in contacting a solution of hop extract containing alpha-acids in a nonpolar, water-immiscible liquid with a sufficiently strong aqueous solution of acid to provide an aqueous phase having a pH of less than 1, separating said aqueous phase from said liquid, contacting said liquid with sufficient aqueous alkali to extract said alpha-acids from said liquid as their salts, separating said aqueous alkali containing said salts from said liquid and subsequently isomerising said alpha-acid salts.

* * * * *